(12) United States Patent
Kogure et al.

(10) Patent No.: US 12,555,987 B2
(45) Date of Patent: Feb. 17, 2026

(54) WIRE HARNESS

(71) Applicant: YAZAKI CORPORATION, Tokyo (JP)

(72) Inventors: Naoto Kogure, Makinohara (JP); Kosuke Tomosada, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 203 days.

(21) Appl. No.: 18/644,118

(22) Filed: Apr. 24, 2024

(65) Prior Publication Data

US 2024/0275148 A1 Aug. 15, 2024

Related U.S. Application Data

(63) Continuation of application No. PCT/JP2023/000669, filed on Jan. 12, 2023.

(30) Foreign Application Priority Data

Feb. 17, 2022 (JP) ................................ 2022-022664

(51) Int. Cl.
*H02G 3/04* (2006.01)
*B60R 16/02* (2006.01)
*H02G 3/34* (2006.01)

(52) U.S. Cl.
CPC ....... *H02G 3/0487* (2013.01); *B60R 16/0215* (2013.01); *H02G 3/0437* (2013.01); *H02G 3/34* (2013.01)

(58) Field of Classification Search
CPC .. B60R 16/0215; B60R 16/0222; H02G 3/32; H02G 3/0418; H02G 3/0437; H02G 11/00; H02G 11/06
See application file for complete search history.

(56) References Cited

U.S. PATENT DOCUMENTS

| | | | | |
|---|---|---|---|---|
| 2,424,759 A | * | 7/1947 | Klumpp, Jr. | ......... H02G 3/0675 174/153 G |
| 3,424,856 A | * | 1/1969 | Coldren | ............... H02G 3/0633 16/2.5 |

(Continued)

FOREIGN PATENT DOCUMENTS

| JP | 2002-315168 A | 10/2002 |
|---|---|---|
| JP | 2020-124073 A | 8/2020 |

OTHER PUBLICATIONS

International Search Report for PCT/JP2023/000669 dated Mar. 14, 2023.

*Primary Examiner* — Paresh Paghadal
(74) *Attorney, Agent, or Firm* — KENEALY VAIDYA LLP

(57) ABSTRACT

A wire harness includes: an electric wire; a plate spring member; a sheath member; and a protector that integrally holds an end part of the sheath member and portions of the electric wire and the plate spring member led out from the end part of the sheath member. The protector includes: a protector main body having a routing space part where the electric wire, the plate spring member, and the sheath member are routed; and a lid part that closes the routing space part. The routing space part is provided with: a pair of regulation parts that supports both ends of the routed plate spring member, and regulates a height position of the plate spring member in the protector with respect to a height direction; and a housing recessed part that is located between the pair of regulation parts and houses an excess portion of the sheath member.

7 Claims, 6 Drawing Sheets

(56) References Cited

U.S. PATENT DOCUMENTS

| | | | | |
|---|---|---|---|---|
| 3,449,687 A * | 6/1969 | Evel | ............... | H03F 3/45381 |
| | | | | 330/253 |
| 5,562,478 A * | 10/1996 | Yamamoto | ......... | H01R 4/2433 |
| | | | | 439/417 |
| 6,161,894 A | 12/2000 | Chapman | | |
| 8,586,880 B2 * | 11/2013 | Zhang | ............... | H02G 3/083 |
| | | | | 174/650 |
| 9,425,545 B2 * | 8/2016 | Bedal | ............... | H01R 4/12 |
| 11,895,814 B1 * | 2/2024 | Lee | ............... | B60R 16/0215 |
| 2014/0027150 A1 * | 1/2014 | Gundel | ............... | H05K 9/00 |
| | | | | 174/102 R |
| 2015/0101837 A1 * | 4/2015 | Evangelista | ......... | H02G 15/113 |
| | | | | 29/525 |
| 2019/0013654 A1 * | 1/2019 | Suenaga | ............ | H02G 3/0487 |
| 2020/0112152 A1 * | 4/2020 | Ide | ............... | H02G 3/0418 |
| 2020/0251890 A1 | 8/2020 | Yamauchi et al. | | |
| 2020/0274130 A1 * | 8/2020 | Chen | ............... | H01M 50/528 |
| 2022/0161742 A1 * | 5/2022 | Saito | ............... | H01B 7/18 |

\* cited by examiner

WIRE HARNESS

CROSS-REFERENCE TO RELATED APPLICATION(S)

This application is a continuation application of International Application No. PCT/JP2023/000669 filed on Jan. 12, 2023 which claims the benefit of priority from Japanese Patent Application No. 2022-022664 filed on Feb. 17, 2022 and designating the U.S., the entire contents of which are incorporated herein by reference.

BACKGROUND OF THE INVENTION

1. Field of the Invention

The present invention relates to a wire harness.

2. Description of the Related Art

For example, power is supplied to electrical components such as sunroofs and sliding doors in automobiles through wire harnesses. Japanese Patent Application Laid-open No. 2020-124073 describes a routing structure that includes a protector configured with a main body part and a lid part, an electric wire, and a sheath member, in which the electric wire is inserted into the sheath member, an end part of the sheath member is fixed to the main body part, and the electric wire led out from the end part is routed inside the main body part. In this type of routing structure, the end part of the sheath member is locked to locking grooves provided to the inner face of the main body part, and the lid part is fitted into the main body part to fix the end part of the sheath member to the protector.

However, since the sheath member into which the electric wire is inserted is formed into a tubular shape with a larger diameter than the electric wire, for example, excess portions such as wrinkles or sagging may be generated in the circumferential direction of the sheath member, and presence of such excess portions may cause variations in the assembly positions of each of the members.

SUMMARY OF THE INVENTION

The present invention is designed in view of the aforementioned circumstances, and it is an object thereof to provide a wire harness that enables each of the members to be assembled in a proper positional relationship.

Solution to Problem

In order to achieve the above mentioned object, a wire harness according to one aspect of the present invention includes an electric wire exhibiting flexibility; an elastic plate spring member that extends along the electric wire and restricts a path of the electric wire; a sheath member exhibiting flexibility into which the electric wire and the plate spring member are inserted; and a holding member that integrally holds an end part of the sheath member and portions of the electric wire and the plate spring member led out from the end part of the sheath member, wherein the holding member comprises; a main body that includes a routing space part where the electric wire, the plate spring member, and the sheath member are routed along an axial direction; and a lid part that is attached to the main body and closes the routing space part, and the routing space parts provided with; a pair of regulation parts that supports both ends of the routed plate spring member in a width direction via the sheath member, the pair of regulation parts regulating a height position of the plate spring member in the holding member with respect to a height direction that intersects with the axial direction; and a housing recessed part that is located between the pair of regulation parts, and houses an excess portion of the sheath member in a circumferential direction.

Advantageous Effects of Invention

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail with reference to the accompanying drawings. It is to be noted that the present invention is not limited by the embodiment. Furthermore, the structural components in the following embodiment include those that are easily replaceable by those skilled in the art, or those that are substantially the same.

Embodiment

Figure 1:
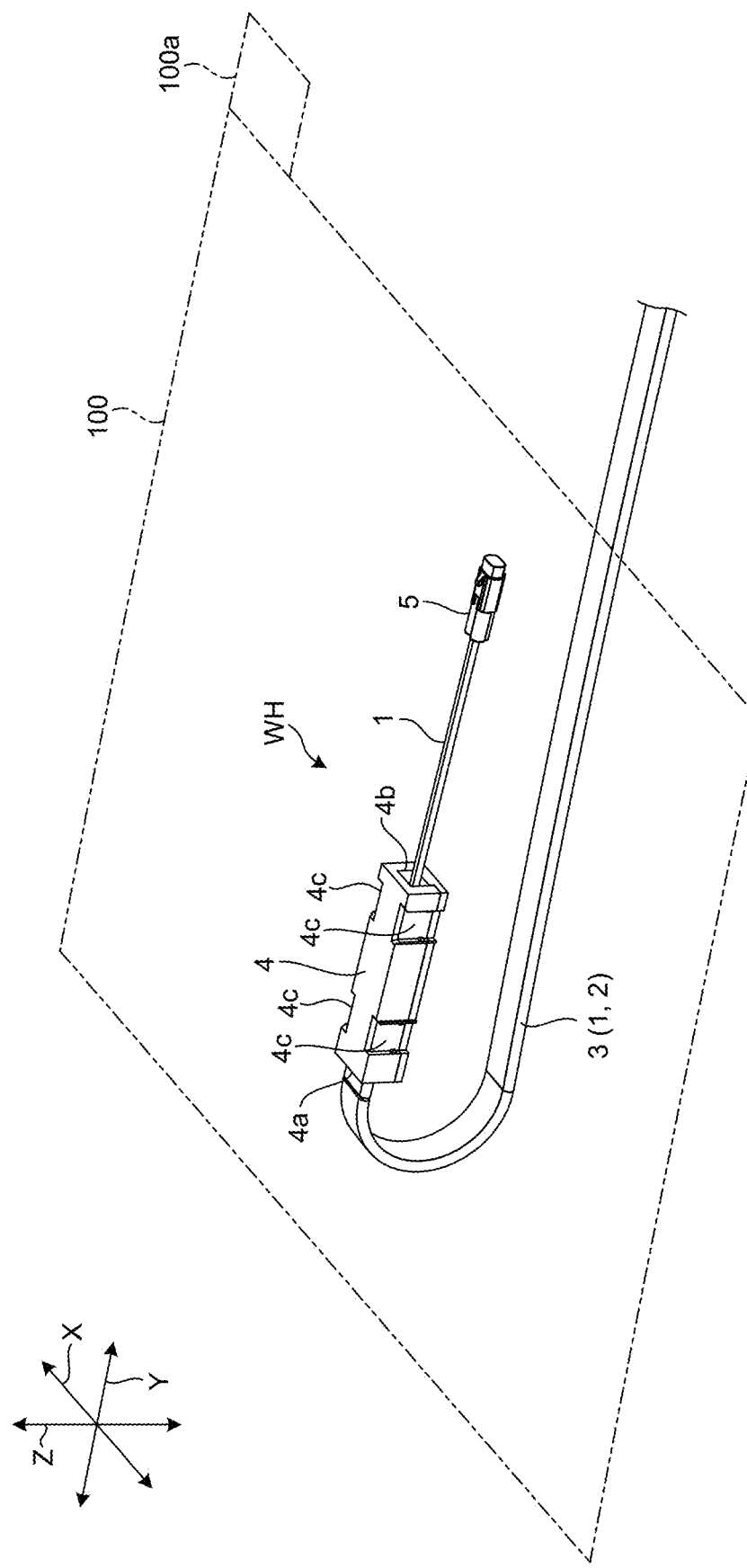
FIG. 1 is a perspective view schematically illustrating a sunroof of an automobile where a wire harness according to an embodiment is disposed.
Figure 2:
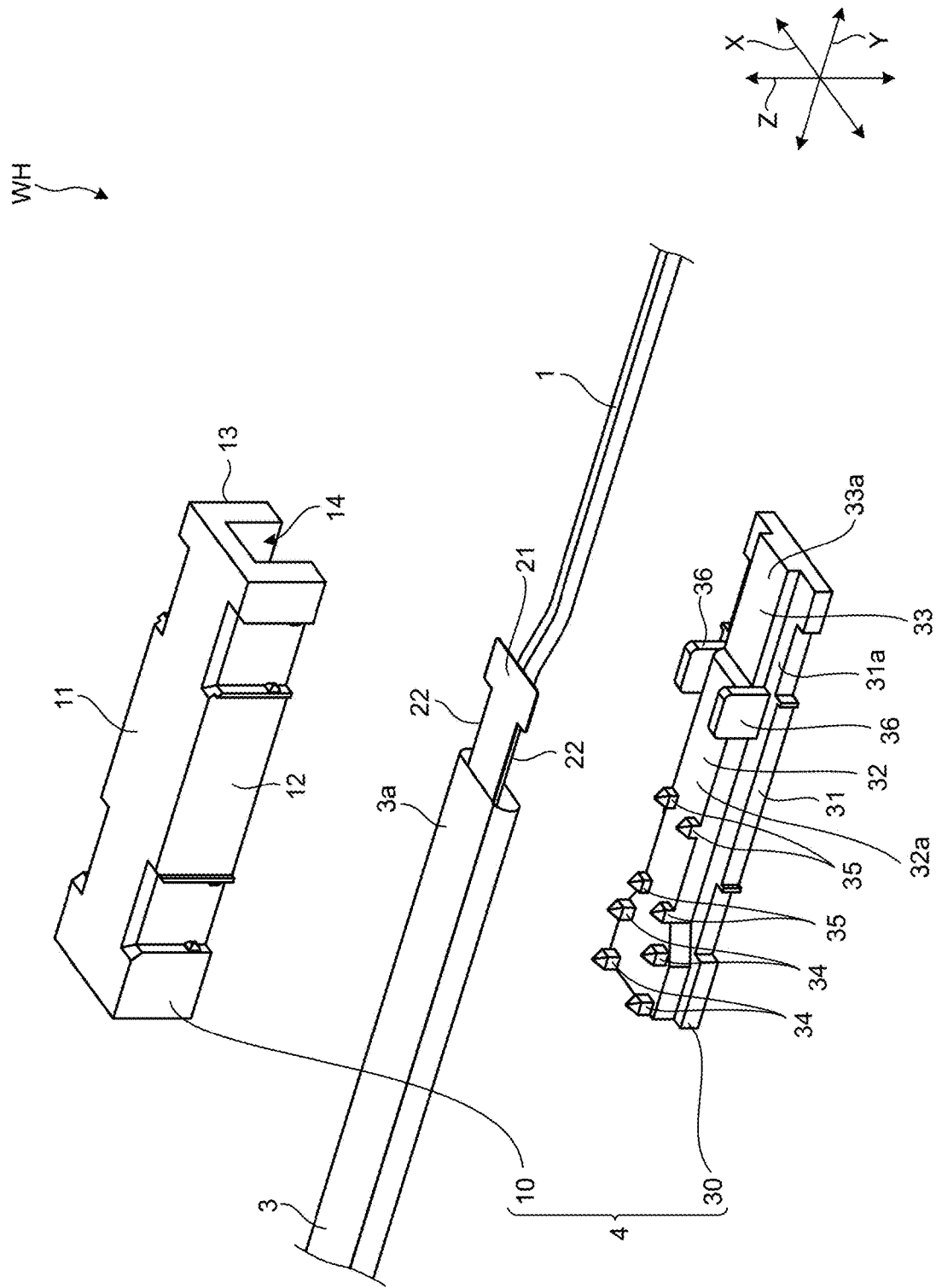
FIG. 2 is an exploded perspective view of the wire harness.
Figure 3:
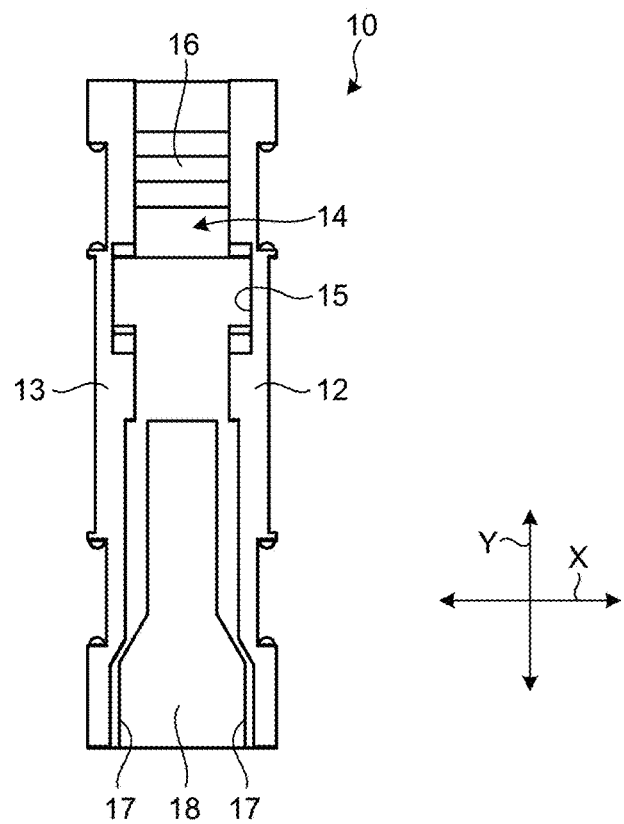
FIG. 3 is a plan view of a protector main body of the wire harness.
Figure 4:
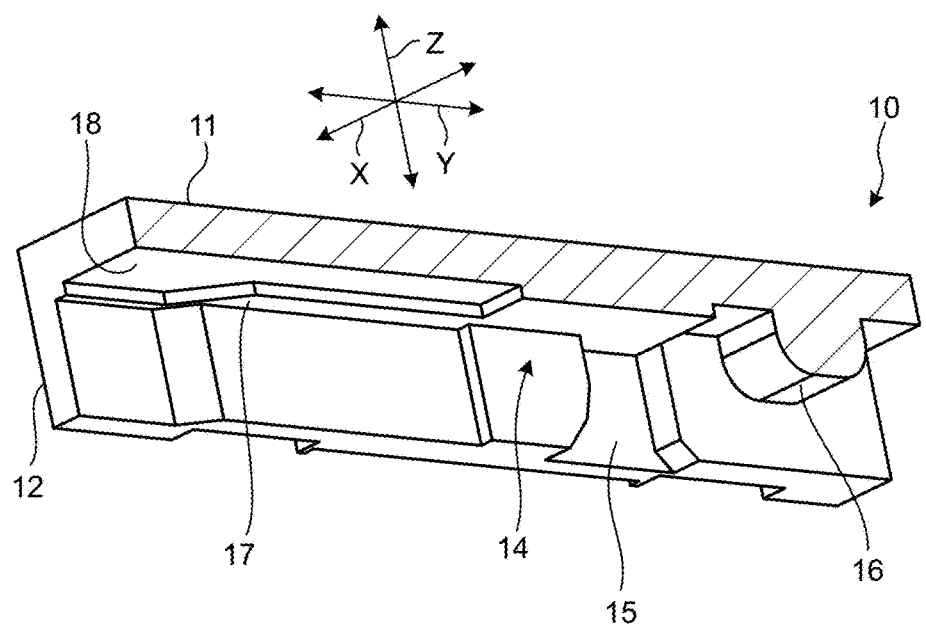
FIG. 4 is a cross-sectional perspective view of the protector main body illustrated in FIG. 3.
Figure 5:
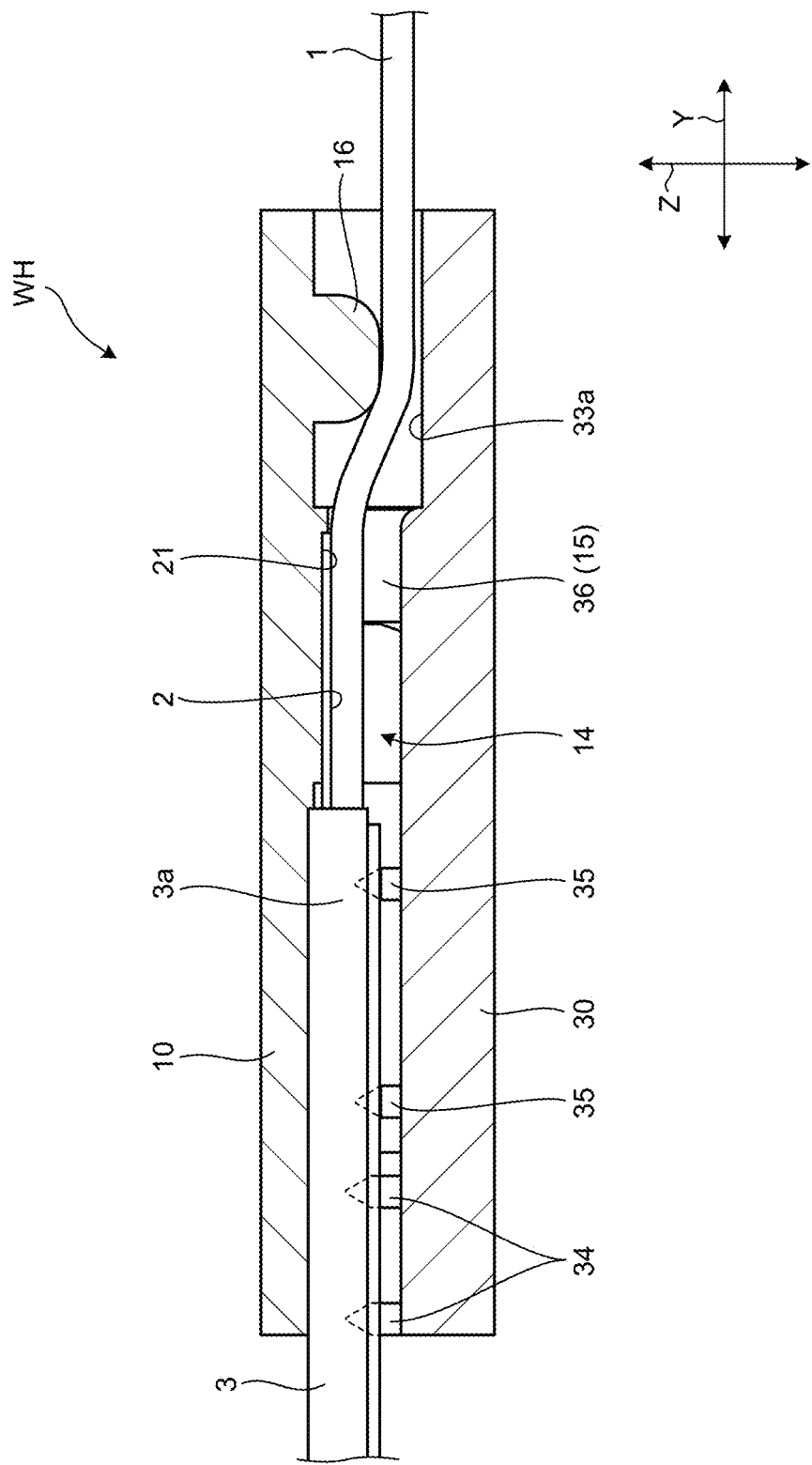
FIG. 5 is an assembly sectional view of the wire harness.

FIG. 1 is a perspective view schematically illustrating a sunroof of an automobile where a wire harness according to an embodiment is disposed. FIG. 2 is an exploded perspective view of the wire harness according to the embodiment. FIG. 3 is a plan view of a protector main body of the wire harness. FIG. 4 is a cross-sectional perspective view of the protector main body illustrated in FIG. 3. FIG. 5 is an assembly sectional view of the wire harness.

As illustrated in FIG. 1, a wire harness WH of the embodiment electrically connects, for example, a car body side of a vehicle and a sunroof (glass window) 100, and it is used for supplying power and for signal communication.

The sunroof 100 is a mobile unit that is loaded on the ceiling of the car body and slides electrically against the car body. The sunroof 100 includes electrical devices 100a such as switches and motors that are activated by the power supplied from a battery of the vehicle. As illustrated in FIG. 1 and FIG. 2, the wire harness WH includes an electric wire 1, a plate spring member 2, a sheath member 3, a protector (holding member) 4, and a connector 5. In the present embodiment, the protector 4 of the wire harness WH is attached to the sunroof 100 by engaging claws of a bracket, not illustrated, with engagement grooves 4c formed on both side faces of the protector 4, for example. Furthermore, the connector 5 provided at an end part of the electric wire 1 led out from the protector 4 is coupled to a mating connector and connected to the electrical device 100a.

In the following description, in regards to a first direction, a second direction, and a third direction intersecting with each other, for convenience, the first direction is referred to as a "width direction X", the second direction is referred to as an "axial direction Y", and the third direction is referred to as a "height direction Z". Herein, the width direction X, the axial direction Y, and the height direction Z are typically orthogonal to (intersecting with) each other. Herein, the axial direction Y corresponds to the direction of sliding movement of the sunroof 100 described above, and corresponds to the axial direction of the protector 4 that is attached to the sunroof 100. The width direction X and the height direction Z correspond to the width direction and height direction of the protector 4 that is attached to the sunroof 100. The height direction Z also applies to the upside-down state of the protector 4.

The electric wire 1 is a conductive member exhibiting flexibility. The electric wire 1 is formed by covering, with an insulating cover part, the outer side of a conductor part (core wire) configured with a plurality of conductive metal strands. In the present embodiment, as illustrated in FIG. 2, the wire harness WH is configured including two electric wires 1.

The plate spring member 2 is an elastic member formed in a band shape, which extends along the electric wires 1 and regulates the path of the electric wires 1.

The sheath member 3 exhibits flexibility. In the present embodiment, the sheath member 3 is formed by weaving insulating fibers into a cylindrical shape (tubular shape), and its cross-sectional shape is an elliptical shape, for example. As illustrated in FIG. 2, the electric wires 1 and the plate spring member 2 are inserted into the sheath member 3. The electric wires 1 and the plate spring member 2 are inserted into the sheath member 3 together in a state of being overlapped in the height direction Z. The end parts of the electric wires 1 and the plate spring member 2 are led out from an end part 3a of the sheath member 3.

An end part 21 of the plate spring member 2 has a convex shape protruding toward the width direction X that intersects with the axial direction Y. Specifically, the plate spring member 2 includes notch parts 22 partially notched in the width direction at both ends of the width direction and, due to the notch parts 22, the end part 21 of the plate spring member 2 forms a convex shape that protrudes relatively in the width direction X. Note that the end part 21 of the plate spring member 2 may simply need to be a convex shape protruding relatively in the width direction X, and it may be a convex shape with both ends of the width direction protruding in the width direction.

As illustrated in FIG. 1, the protector 4 is formed into a hollow and substantially square tube shape with an insulating synthetic resin. The protector 4 has the electric wires 1, the plate spring member 2, and the sheath member 3 introduced from an introduction port 4a provided at one end in the axial direction, and leads out the electric wires 1 from a lead-out port 4b provided at the other end in the axial direction. In the present embodiment, as illustrated in FIG. 2, the protector 4 routes the electric wires 1, the plate spring member 2, and the sheath member 3, and integrally holds inside thereof the end part 3a of the sheath member 3 and the portions of the electric wires 1 and the plate spring member 2 led out from the end part 3a of the sheath member 3.

The protector 4 is configured including a protector main body (main body) 10 and a lid part 30. The protector main body 10 has a first side face part 11, a second side face part 12, and a third side face part 13. In the example illustrated in FIG. 2, the protector main body 10 is formed in a U-shape with the second side face part 12 and the third side face part 13 mutually opposing to each other and a face (bottom face) opposing to the first side face part 11 as a top face being opened. The protector main body 10 includes a routing space part 14 formed by the first side face part 11, the second side face part 12, and the third side face part 13, and the routing space part 14 allows the electric wires 1, the plate spring member 2, and the sheath member 3 to be routed along the axial direction Y. In this case, the electric wires 1 and the plate spring member 2 are inserted into the sheath member 3 in a state where the plate spring member 2 is overlapped with the electric wires 1 with the plate spring member 2 being on the protector main body 10 side. Thus, in the sheath member 3, the electric wires 1 are located on the lid part 30 side.

The lid part 30 is formed in a plate-like shape and, in the example illustrated in FIG. 2, it is attached to the face (bottom face) opposing to the first side face part 11 of the protector main body 10 and closes the routing space part 14 mentioned above. In the present embodiment, the lid part 30 is attached to the protector main body 10 by being fitted into the second side face part 12 and the third side face part 13 of the protector main body 10. The lid part 30 includes a base part 31, a first fitting base part 32, a second fitting base part 33, a plurality of first protrusions 34 and second protrusions 35, and a pair of fitting pieces 36. The base part 31 closes the routing space part 14 and configures a side face of the protector 4, when the protector main body 10 and the lid part 30 are fitted together.

The first fitting base part 32 and the second fitting base part 33 are each provided side-by-side along the axial direction Y on a top face (the face opposing to the routing space part 14 of the protector main body 10) 31a of the base part 31. The first fitting base part 32 is formed on the introduction port 4a (FIG. 1) side of the protector 4 in the axial direction Y, and the second fitting base part 33 is formed on the lead-out port 4b side. The first fitting base part 32 and second fitting base part 33 have outer faces in the same shape as the inner faces of the second side face part 12 and the third side face part 13, and are fitted between the second side face part 12 and the third side face part 13. In the present embodiment, when the top face 31a of the base part 31 is used as a reference, a top face (the face opposing to the routing space part 14 of the protector main body 10) 32a of the first fitting base part 32 is formed such that the height position thereof in the height direction Z is higher than a top face (the face opposing to the routing space part 14 of the protector main body 10) 33a of the second fitting base part 33.

The first protrusions 34 and second protrusions 35 are erected to protrude from the top face (the face opposing to the routing space part 14 of the protector main body 10) of the first fitting base part 32 toward the protector main body 10. As illustrated in FIG. 5, those first protrusions 34 and second protrusions 35 are locked to the sheath member 3 routed in the routing space part 14 to fix the sheath member 3 in the protector 4. Specifically, since the sheath member 3 is formed by weaving resin fibers, the tips of the first protrusions 34 and second protrusions 35 stick into (penetrate) the gaps in the mesh of the sheath member 3, thereby locking the sheath member 3. While the sheath member 3 is formed by weaving resin fibers in the present embodiment, it may also be formed with a flexible material (synthetic rubber or the like), for example, as long as it can be locked to the tips of the first protrusions 34 and the second protrusions 35. Alternatively, the tips of the first protrusions 34 and the second protrusions 35 may be locked to grooves of a corrugated tube.

In the present embodiment, the first protrusions 34 are formed on the introduction port 4a side of the protector 4 in the axial direction Y, and the second protrusions 35 are formed on the center side of the axial direction Y than the first protrusions 34 are. The first protrusions 34 are also formed on the outer side of the protector 4 in the width direction X, and the second protrusions 35 are formed on the center side (inner side) of the width direction X than the first protrusions 34 are. Furthermore, the height positions of the tips of the first protrusions 34 and the second protrusions 35 with respect to the height direction Z of the protector 4 are different depending on the formed positions of each of the protrusions. In the example in FIG. 2, the height positions of the tips of the first protrusions 34 and the second protrusions 35 with respect to the height direction Z are different. For example, when the plate spring member 2 routed in the routing space part 14 is used as a reference, the height position of the tips of the first protrusions 34 is lower than that of the tips of the second protrusions 35. As described, since the height positions of the tips of the first protrusions 34 and the second protrusions 35 with respect to the height direction Z of the protector 4 are different depending on the formed positions of each of the protrusions, it is possible to properly assemble each of the structural components even when the sheath member 3 comes to have excess portions such as wrinkles or sagging generated in the circumferential direction of the sheath member, for example. Furthermore, even when the sheath member 3 is pulled, the stress is distributed due to the first protrusions 34 and the second protrusions 35 of different heights, thereby preventing excessive load from being placed on the protrusions or the sheath member 3.

The pair of fitting pieces 36 are lined in the width direction X by sandwiching the first fitting base part 32, and are erected on the top face 31a of the base part 31. The pair of fitting pieces 36 are also formed on the second fitting base part 33 side of the first fitting base part 32 in the axial direction Y. The fitting pieces 36 are fitted into recessed parts 15 formed respectively in the inner faces of the second side face part 12 and the third side face part 13 of the protector main body 10.

In the meantime, the protector main body 10 includes the recessed parts 15 and a protrusion part 16 formed on the inner face exposed in the routing space part 14, as illustrated in FIG. 3 and FIG. 4. The protrusion part 16 is formed on the lead-out port 4b (FIG. 1) side of the protector 4 in the axial direction Y, and protrudes toward the lid part 30. As illustrated in FIG. 5, the protrusion part 16 is formed by opposing to the top face 33a of the second fitting base part 33 of the lid part 30 and, with the top face 33a of the second fitting base part 33, sandwiches part of the electric wires 1 led out from the end part 3a of the sheath member 3 and routed in the routing space part 14.

In the present embodiment, the electric wires 1 are disposed on the lid part 30 side than the plate spring member 2 is. Furthermore, the protrusion part 16 protrudes from the protector main body 10 toward the lid part 30. This makes it easier to separate the electric wires 1 from the plate spring member 2, when the electric wires 1 are sandwiched between the protrusion part 16 and the top face 33a of the second fitting base part 33. Thus, for example, it is possible to prevent the electric wires 1 from contacting the end part of the plate spring member 2, so that the electric wires 1 are less likely to be damaged. Furthermore, as illustrated in FIG. 4 and FIG. 5, the face of the protrusion part 16 opposing to the electric wires 1 in the cross section along the axial direction is curved. Therefore, when the electric wires 1 are sandwiched between the protrusion part 16 and the top face 33a of the second fitting base part 33, damage to the electric wires 1 caused by the sandwiching can be suppressed.

As illustrated in FIG. 5, the recessed part 15 is formed between the protrusion part 16 and the first protrusions 34 as well as the second protrusions 35 provided on the lid part 30 in the axial direction Y. The recessed part 15 is formed in each of the inner faces of the second side face part 12 and the third side face part 13, and engages with the convex-shaped end part 21 of the plate spring member 2 to position the end part 21 of the plate spring member 2 in the axial direction Y. When assembling the wire harness WH, the electric wires 1 and the plate spring member 2 inserted into the sheath member 3 are disposed in the routing space part 14, and the convex-shaped end part 21 of the plate spring member 2 is engaged with the recessed parts 15 of the protector main body 10. This makes it easy to position the end part 21 of the plate spring member 2 in the axial direction Y, and allows the electric wires 1, the plate spring member 2, and the sheath member 3 to be assembled to the protector main body 10. In addition, the pair of fitting pieces 36 provided on the lid part 30 are respectively fitted into the recessed parts 15. This prevents the end part 21 of the plate spring member 2 from detaching from the recessed parts 15 by assembling the lid part 30 to the protector main body 10, and the plate spring member 2 can be fixed to the protector 4.

By the way, since the sheath member 3 into which the electric wires 1 and the plate spring member 2 are inserted is formed into a tubular shape with a larger diameter than the electric wires 1 and the plate spring member 2, for example, excess portions such as wrinkles or sagging may be generated in the circumferential direction of the sheath member 3, and presence of such excess portions may cause variations in the assembly positions of each of the members (the electric wires 1, the plate spring member 2, and the sheath member 3) in the protector 4. Furthermore, the wire harness WH according to the present embodiment connects, for example, the car body side of the vehicle and the sunroof 100, and the position and shape of the wire harness WH change following the sliding movement of the sunroof 100. Therefore, with the wire harness WH, it is desirable to assemble each of the members in the protector 4 in a proper positional relationship in order to ensure stable operations.

Figure 6:
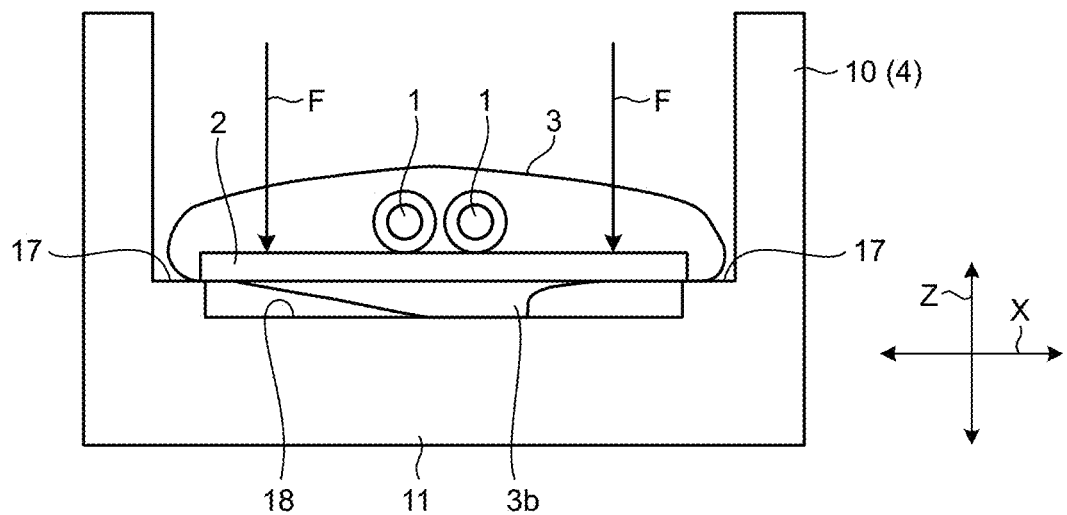
FIG. 6 is a schematic view illustrating a positional relationship of each member assembled to the protector main body.

Next, the structure for assembling each of the members (the electric wires 1, the plate spring member 2, and the sheath member 3) in the protector 4 in a proper positional relationship will be described. FIG. 6 is a schematic view illustrating a positional relationship of each of the members assembled to the protector main body. In FIG. 6, the illustration of the lid part is omitted and the top and bottom are illustrated upside down with respect to FIG. 2.

As illustrated in FIG. 3, FIG. 4, and FIG. 6, the protector main body 10 is configured including regulation parts 17 and a housing recessed part 18 formed on the inner face exposed in the routing space part 14. The regulation parts 17 and the housing recessed part 18 are provided on the opposite side of the first protrusions 34 and the second protrusions 35 with respect to the height direction Z. As illustrated in FIG. 6, the regulation parts 17 are formed on both sides of the width direction X on the inner face side of the first side portion 11, and support both end parts in the width direction X of the plate spring member 2 routed in the routing space part 14 via the sheath member 3. Furthermore, the regulation parts 17 regulate the height position of the plate spring member 2 in the protector main body 10 (the protector 4) with respect to the height direction Z.

In the present embodiment, as illustrated in FIG. 1, the plate spring member 2 along with the electric wires 1 and the sheath member 3 is curved in a substantially U-shape on the outer side the protector 4. That is, the plate spring member 2 is folded back in the axial direction Y on the outer side the protector 4 and placed to go under the protector 4 in the height direction Z. Thus, an energizing force generated by the curvature acts on the end part of the plate spring member 2 and, as illustrated in FIG. 6, the plate spring member 2 inside the protector main body 10 (the protector 4) is constantly pressed against the regulation parts 17 by the energizing force F. This allows the height position of the plate spring member 2 in the protector 4 to be set at the position of the regulation parts 17 (the reference position).

As illustrated in FIG. 6, the housing recessed part 18 is a recessed part that is located between the pair of regulation parts 17 and formed to be more distant from the plate spring member 2 in the height direction Z than the regulation parts 17 are. As described above, the housing recessed part 18 houses an excess portion 3b such as a wrinkle or sagging generated in the circumferential direction of the sheath member 3, for example. With a configuration without providing the housing recessed part, the excess portion 3b of the sheath member 3 is interposed between the plate spring member 2 and the regulation parts 17, so that the plate spring member 2 cannot be positioned at the reference position, resulting in having variations in the assembly positions of each of the members. Furthermore, the excess portion 3b of the sheath member 3 may prevent the lid part 30 from being attached properly.

In the present embodiment, by providing the housing recessed part 18 that is located between the pair of regulation parts 17 and formed to be more distant from the plate spring member 2 in the height direction Z than the regulation parts 17 are, when the excess portion 3b such as a wrinkle or sagging is generated in the circumferential direction of the sheath member 3, for example, the excess portion 3b is housed in the housing recessed part 18. Therefore, regardless of the excess portion 3b, it is possible to set the height position of the plate spring member 2 at the reference position, attach the lid part 30 properly, and assemble each of the members in a proper positional relationship.

Figure 7:
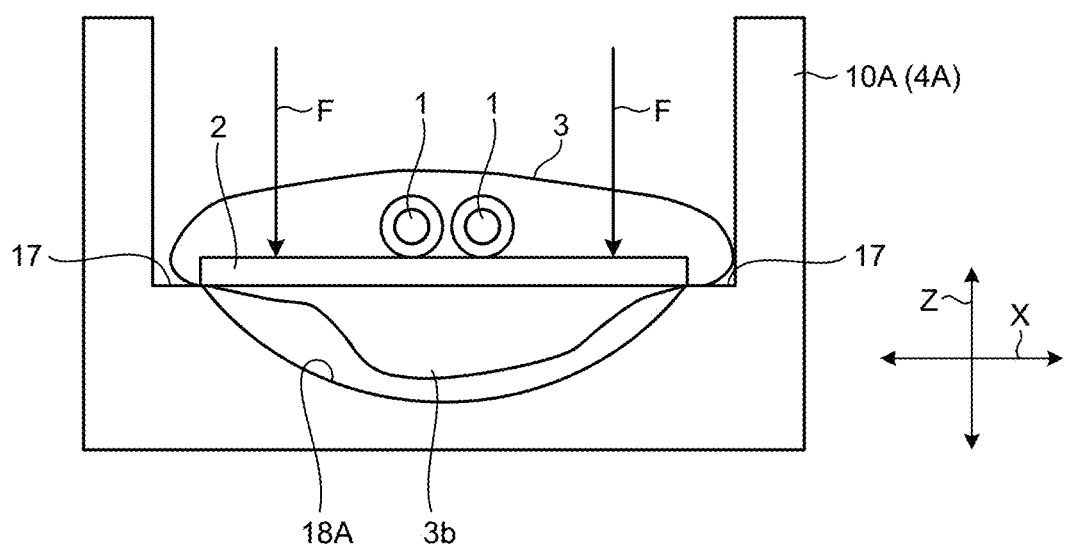
FIG. 7 is a schematic view illustrating a positional relationship of each member assembled to a protector main body with a housing recessed part according to a modification example.
Figure 8:
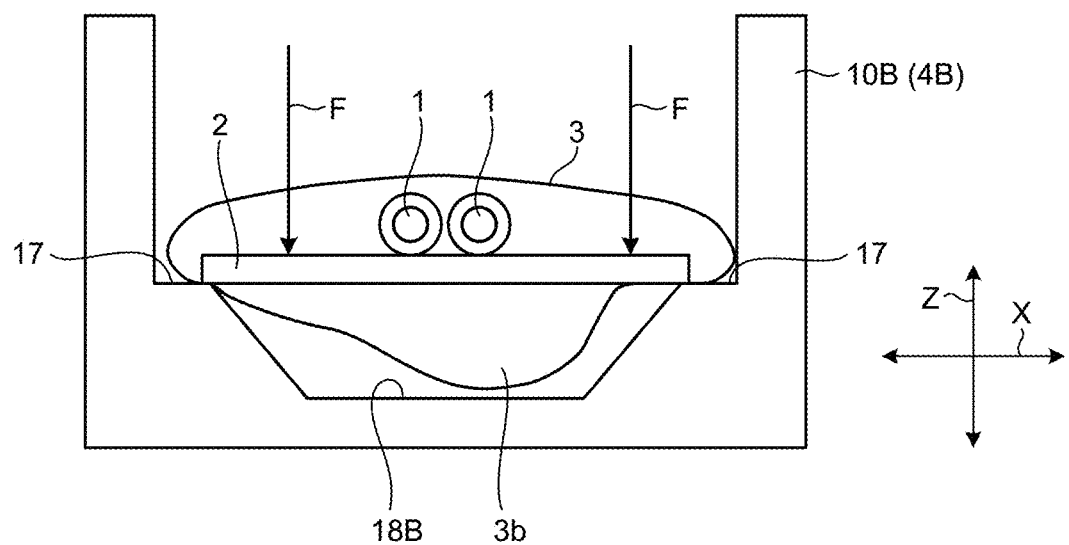
FIG. 8 is a schematic view illustrating a positional relationship of each member assembled to a protector main body with a housing recessed part according to a modification example.

Next, modification examples of the housing recessed part will be described. FIG. 7 and FIG. 8 are schematic views illustrating positional relationships of each of the members assembled to a protector main body with a housing recessed part according to modification examples. In FIG. 7 and FIG. 8, the illustration of the lid part is also omitted and the top and bottom are illustrated upside down with respect to FIG. 2. In FIG. 6, the housing recessed part that is formed in a planar shape almost parallel to a hypothetical plane connecting the pair of regulation parts 17, 17 is described. However, the shape and depth of the housing recessed part can be changed as appropriate.

For example, as illustrated in FIG. 7, a protector main body 10A (a protector 4A) may be provided with a housing recessed part 18A having an arc-shaped curved bottom face (top face) between a pair of regulation parts 17, 17. Furthermore, as illustrated in FIG. 8, a protector main body 10B (a protector 4B) may be provided with a housing recessed part 18B having a trapezoidal bottom face (top face) between a pair of regulation parts 17, 17. The shape and depth of the housing recessed parts 18A, 18B are selected according to the size and the like of the excess portion 3b that is expected to be generated in the circumferential direction of the sheath member 3. With such modification examples, regardless of the excess portion 3b, it is also possible to set the height position of the plate spring member 2 in the protector 4 at the reference position, attach the lid part 30 properly, and assemble each of the members in a proper positional relationship.

As described above, the wire harness WH according to the present embodiment includes: the electric wires 1 exhibiting flexibility; the elastic plate spring member 2 that extends along the electric wires 1 and regulates the path of the electric wires 1; the sheath member 3 exhibiting flexibility into which the electric wires 1 and the plate spring member 2 are inserted; and the protector 4 that integrally holds the end part 3a of the sheath member 3 and the portions of the electric wires 1 and the plate spring member 2 led out from the end part 3a of the sheath member 3. The protector 4 includes: the protector main body 10 having the routing space part 14 where the electric wires 1, the plate spring member 2, and the sheath member 3 are routed along the axial direction Y; and the lid part 30 that is attached to the protector main body 10 and closes the routing space part 14. The routing space part 14 is provided with: the pair of regulation parts 17 that supports both ends of the routed plate spring member 2 in the width direction via the sheath member 3, and regulates the height position of the plate spring member 2 in the protector 4 with respect to the height direction Z that intersects with the axial direction Y; and the housing recessed part 18 that is located between the pair of regulation parts 17, 17, and houses the excess portion 3b of the sheath member 3 in the circumferential direction.

With such a configuration, even when the excess portion 3b such as a wrinkle or sagging is generated in the circumferential direction of the sheath member 3, for example, the excess portion 3b is housed in the housing recessed part 18. Therefore, regardless of the excess portion 3b, it is possible to set the height position of the plate spring member 2 at the reference position that is at the regulation parts 17 and assemble each of the members in a proper positional relationship.

Furthermore, in the wire harness WH of according to the present embodiment, the plate spring member 2 is curved in a substantially U-shape on the outer side the protector 4, and it is pressed against the regulation parts 17 via the sheath member 3 by the energizing force of the plate spring member 2 and supported by the regulation parts 17. With such a configuration, the energizing force generated due to the curvature of the plate spring member 2 acts on the end part of the plate spring member 2, and the plate spring member 2 in the protector 4 is constantly pressed against the regulation parts 17 by the energizing force. This allows the height position of the plate spring member 2 in the protector 4 to be set at the position of the regulation parts 17 (the reference position).

Furthermore, in the wire harness WH according to the present embodiment, the protector 4 has the first protrusions 34 and the second protrusions 35 which protrude from the lid part 30 toward the protector main body 10 and lock the sheath member 3 on the opposite side of the regulation parts 17 with respect to the height direction Z. With such a configuration, the sheath member 3 whose movement in the height direction Z is restricted by the regulation parts 17 can be locked by the first protrusions 34 and the second protrusions 35.

Furthermore, in the wire harness WH according to the present embodiment, the sheath member 3 is formed by weaving insulating fibers into a tubular shape. With such a configuration, the tips of the first protrusions 34 and second protrusions 35 stick into (penetrate) the gaps in the mesh of the sheath member 3, thereby making it possible to lock the sheath member 3.

Note that the wire harnesses WH according to the embodiment of the present invention described above is not limited to the embodiment described above, and various changes are possible within the scope of the appended claims. For example, while the protrusion part 16 that holds part of the electric wires 1 is provided in the protector main body 10 in the present embodiment, it is not limited thereto and may also protrude from the lid part 30 toward the protector main body 10. In addition, while a plurality of first protrusions 34 and second protrusions 35 for locking the sheath member 3 are provided on the lid part 30, the first protrusions 34 and second protrusions 35 may be provided from the protector main body 10 toward the lid part 30.

Furthermore, while the sheath member 3 is described in the present embodiment as a configuration formed by weaving insulating fibers into a tubular shape, it is not limited thereto as long as it can be engaged with the first protrusions 34 and the second protrusions 35. For example, a rubber-based material exhibiting flexibility may be used. Furthermore, it may also be a configuration with a plurality of groove parts that engage with the tips of the protrusions, such as a corrugated tube.

Moreover, while the reference for the height positions of the tips of the first protrusions 34 and the second protrusions 35 with respect to the height direction Z is defined as the plate spring member 2 in the present embodiment, it is not limited thereto and, for example, the top face 32a of the first fitting base part 32 of the lid part 30 may be used as the reference. In this case, the height position of the tips of the first protrusions 34 is higher than that of the second protrusions 35.

Moreover, while the structure of pressing the plate spring member 2 against the regulation parts 17 via the sheath member 3 by utilizing the energizing force of the plate spring member 2 is described in the present embodiment, the structure is not limited thereto. For example, some of the first protrusions 34 and the second protrusions 35 may be formed to extend until the tips thereof reach the plate spring member 2, and such first protrusions 34 and second protrusions 35 may be used as the structure to press the plate spring member 2 against the regulation parts 17 via the sheath member 3. Furthermore, for example, the sheath member 3 into which the electric wires 1 and the plate spring member 2 are inserted and the protector main body may be tightened with a band to press the plate spring member 2 against the regulation parts 17 via the sheath member 3.

Moreover, while the sunroof 100 is described in the present embodiment as the mobile unit to which the wire harness WH is provided, it is certainly possible to provide the wire harness to a sliding door, for example.

According to the wire harnesses of the present embodiment, it is possible to achieve such an effect that each of the members can be assembled in a proper positional relationship.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A wire harness comprising:
an electric wire exhibiting flexibility;
an elastic plate spring member that extends along the electric wire and restricts a path of the electric wire;
a sheath member exhibiting flexibility into which the electric wire and the plate spring member are inserted; and
a holding member that integrally holds an end part of the sheath member and portions of the electric wire and the plate spring member led out from the end part of the sheath member, wherein
the holding member comprises;
a main body that includes a routing space part where the electric wire, the plate spring member, and the sheath member are routed along an axial direction; and
a lid part that is attached to the main body and closes the routing space part, and
the routing space parts provided with;
a pair of regulation parts that supports both ends of the routed plate spring member in a width direction via the sheath member, the pair of regulation parts regulating a height position of the plate spring member in the holding member with respect to a height direction that intersects with the axial direction; and
a housing recessed part that is located between the pair of regulation parts, and houses an excess portion of the sheath member in a circumferential direction.

2. The wire harness according to claim 1, wherein the plate spring member is curved on an outer side of the holding member, and supported by the regulation parts by being pressed against the regulation parts by an energizing force of the plate spring member via the sheath member.

3. The wire harness according to claim 1, wherein the holding member includes a plurality of protrusions protruding from the lid part toward the main body, the protrusions locking the sheath member on an opposite side of the regulation parts with respect to the height direction.

4. The wire harness according to claim 2, wherein the holding member includes a plurality of protrusions protruding from the lid part toward the main body, the protrusions locking the sheath member on an opposite side of the regulation parts with respect to the height direction.

5. The wire harness according to claim 1, wherein the sheath member is formed by weaving insulating fibers into a tubular shape.

6. The wire harness according to claim 2, wherein the sheath member is formed by weaving insulating fibers into a tubular shape.

7. The wire harness according to claim 3, wherein the sheath member is formed by weaving insulating fibers into a tubular shape.

\* \* \* \* \*